(12) United States Patent
Imamichi et al.

(10) Patent No.: US 12,717,467 B2
(45) Date of Patent: Aug. 25, 2026

(54) INFORMATION PROCESSING APPARATUS, INFORMATION PROCESSING METHOD, AND INFORMATION PROCESSING PROGRAM

(71) Applicant: FUJIFILM Corporation, Tokyo (JP)

(72) Inventors: Eiichi Imamichi, Tokyo (JP); Takuya Yuzawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 189 days.

(21) Appl. No.: 18/613,152

(22) Filed: Mar. 22, 2024

(65) Prior Publication Data

US 2024/0231593 A1 Jul. 11, 2024

Related U.S. Application Data

(63) Continuation of application No. PCT/JP2022/035536, filed on Sep. 22, 2022.

(30) Foreign Application Priority Data

Sep. 27, 2021 (JP) ................................ 2021-157275

(51) Int. Cl.
*G06F 3/04847* (2022.01)
*G06F 3/04842* (2022.01)
*G06V 10/25* (2022.01)

(52) U.S. Cl.
CPC ...... *G06F 3/04847* (2013.01); *G06F 3/04842* (2013.01); *G06V 10/25* (2022.01); *G06V 2201/03* (2022.01)

(58) Field of Classification Search
CPC . G06F 3/04847; G06F 3/04842; G06V 10/25; G06V 2201/03; A61B 5/743;
(Continued)

(56) References Cited

U.S. PATENT DOCUMENTS 7,031,596 B2 4/2006 Sai et al.
2006/0126909 A1 6/2006 Marshall et al.
(Continued)

FOREIGN PATENT DOCUMENTS

JP 2001292402 10/2001
JP 2009285147 12/2009
(Continued)

OTHER PUBLICATIONS

"International Search Report (Form PCT/ISA/210) of PCT/JP2022/035536", mailed on Nov. 15, 2022, with English translation thereof, pp. 1-5.
(Continued)

*Primary Examiner* — Cao H Nguyen
(74) *Attorney, Agent, or Firm* — JCIPRNET

(57) ABSTRACT

An information processing apparatus including at least one processor, wherein the processor is configured to: acquire a group of images to which mutually independent attribute information is assigned and which are spatially or temporally continuous; and display a slider bar for receiving an operation of selecting an image to be displayed on a display among the group of images, on the display by changing a display form based on the attribute information that is assigned to each of the images.

15 Claims, 10 Drawing Sheets

(58) Field of Classification Search
CPC ...... A61B 6/5217; G16H 40/63; G16H 30/20; G16H 30/40; G16H 50/20
See application file for complete search history.

(56) References Cited

U.S. PATENT DOCUMENTS

| | | | | |
|---|---|---|---|---|
| 2011/0110576 | A1* | 5/2011 | Kreeger | G06F 3/04815 382/132 |
| 2015/0356732 | A1 | 12/2015 | Fukuda | |
| 2018/0300889 | A1* | 10/2018 | Tanaka | G06T 7/62 |
| 2019/0279751 | A1 | 9/2019 | Nakamura et al. | |
| 2022/0392124 | A1* | 12/2022 | Ishigaki | G06F 3/04845 |

FOREIGN PATENT DOCUMENTS

| | | |
|---|---|---|
| JP | 2010131239 | 6/2010 |
| JP | 2018175410 | 11/2018 |
| JP | 2019153250 | 9/2019 |
| WO | 2014148242 | 9/2014 |
| WO | 2021181731 | 9/2021 |

OTHER PUBLICATIONS

"Written Opinion of the International Searching Authority (Form PCT/ISA/237) of PCT/JP2022/035536", mailed on Nov. 15, 2022, with English translation thereof, pp. 1-6.
"Notice of Reasons for Refusal of Japan Counterpart Application", issued on Jan. 20, 2026, with English translation thereof, p. 1-p. 5.
"Notice of Reasons for Refusal of Japan Counterpart Application", issued on May 26, 2026, with English translation thereof, p. 1-p. 5.

* cited by examiner

| TOMOGRAPHIC ID | ATTRIBUTE INFORMATION | | | |
|---|---|---|---|---|
| | ORGAN | LESION 1 | LESION 2 | LESION 3 |
| T000 | BRAIN | - | - | - |
| T001 | BRAIN | - | - | - |
| ⋮ | ⋮ | ⋮ | ⋮ | ⋮ |
| T100 | LUNG | NODULE | CALCIFICATION | - |
| T101 | LUNG | NODULE | CALCIFICATION | SPICULE |
| T102 | LUNG | GROUND-GLASS OPACITY | - | - |
| ⋮ | ⋮ | ⋮ | ⋮ | ⋮ |
| T200 | LIVER | CALCIFICATION | - | - |
| T201 | LIVER | - | - | - |
| ⋮ | ⋮ | ⋮ | ⋮ | ⋮ |
| Tm | KIDNEY | - | - | - |

D1
90
92
80
82
94
* PLEASE
DESIGNATE ORGAN.
SA
AA
T100

T100
AA
SA
D3
90
92
80
82
94
LUNG
SELECT ALL
NODULE
5
CALCIFICATION
2
SPICULE
1
GROUND-GLASS OPACITY
3

FIRST INFORMATION PROCESSING
ACQUIRE PLURALITY OF IMAGES
S10
EXTRACT REGION OF INTEREST
S12
ASSIGN ATTRIBUTE INFORMATION
S14
DISPLAY SCREEN IN WHICH IMAGES DISPLAYABLE ON DISPLAY ARE LIMITED, BASED ON ATTRIBUTE INFORMATION
S16
END

INFORMATION PROCESSING APPARATUS, INFORMATION PROCESSING METHOD, AND INFORMATION PROCESSING PROGRAM

CROSS REFERENCE TO RELATED APPLICATIONS

This application is a continuation of International Application No. PCT/JP2022/035536, filed on Sep. 22, 2022, which claims priority from Japanese Patent Application No. 2021-157275, filed on Sep. 27, 2021. The entire disclosure of each of the above applications is incorporated herein by reference.

BACKGROUND

Technical Field

The present disclosure relates to an information processing apparatus, an information processing method, and an information processing program.

Related Art

In the related art, image diagnosis using three-dimensional medical images captured by imaging apparatuses such as computed tomography (CT) apparatuses and magnetic resonance imaging (MRI) apparatuses is performed. For example, JP2009-285147A discloses that one tomographic image representing one tomographic plane that is included in a three-dimensional medical image is displayed on a screen and that the tomographic image to be displayed on the screen is set to be designatable by sliding a slide bar.

In addition, medical images are analyzed via computer-aided detection/diagnosis (CAD) using a discriminator in which learning is performed by deep learning or the like, and structures of interest such as lesions included in the medical images are detected and/or diagnosed. Further, as a technology for supporting a creation of an image interpretation report, JP2019-153250A discloses that text to be included in the image interpretation report is generated based on an analysis result of the medical image by CAD.

In recent years, advances in imaging apparatuses have increased the number of tomographic images included in a three-dimensional medical image. As a result, in a case where a tomographic image to be displayed on a screen by a slide bar as described in JP2009-285147A is designated, there is a case where it is difficult to designate a tomographic image to be focused on.

SUMMARY

The present disclosure provides an information processing apparatus, an information processing method, and an information processing program capable of easily designating a desired image.

According to a first aspect of the present disclosure, there is provided an information processing apparatus comprising: at least one processor, in which the processor acquires a group of images to which mutually independent attribute information is assigned and which are spatially or temporally continuous, and displays a slider bar for receiving an operation of selecting an image to be displayed on a display among the group of images, on the display by changing a display form based on the attribute information that is assigned to each of the images.

According to a second aspect of the present disclosure, in the first aspect, the processor may enlarge a portion of the slider bar corresponding to an image in a range determined based on designated attribute information among the group of images and display the portion of the slider bar on the display.

According to a third aspect of the present disclosure, in the first aspect or the second aspect, the processor may display markers having different forms according to the attribute information at a position corresponding to the slider bar with respect to each of the images.

According to a fourth aspect of the present disclosure, in any one of the first aspect to the third aspect, the processor may display a marker at a position corresponding to the slider bar with respect to an image to which designated attribute information is assigned.

According to a fifth aspect of the present disclosure, in any one of the first aspect to the fourth aspect, each of the group of images may include a region of interest, and the attribute information may indicate an attribute of the region of interest.

According to a sixth aspect of the present disclosure, in the fifth aspect, the region of interest may be a region of a structure included in the image.

According to a seventh aspect of the present disclosure, in the fifth aspect or the sixth aspect, the region of interest may be a region of an abnormal shadow included in the image.

According to an eighth aspect of the present disclosure, in any one of the fifth aspect to the seventh aspect, the region of interest may be a region that is included in the image and that is designated by a user.

According to a ninth aspect of the present disclosure, in any one of the fifth aspect to the eighth aspect, the attribute information may indicate a type of the region of interest.

According to a tenth aspect of the present disclosure, in any one of the fifth aspect to the ninth aspect, the attribute information may indicate a feature amount of the region of interest.

According to an eleventh aspect of the present disclosure, in any one of the fifth aspect to the tenth aspect, the processor may extract the region of interest with respect to each of the group of images, and may generate the attribute information based on a feature amount of the extracted region of interest.

According to a twelfth aspect of the present disclosure, in the eleventh aspect, the processor may assign information that indicates an extraction method used for extracting the region of interest to an image from which the region of interest is extracted, as the attribute information.

According to a thirteenth aspect of the present disclosure, in any one of the first aspect to the twelfth aspect, the attribute information may indicate a purpose for which the image is captured.

According to a fourteenth aspect of the present disclosure, in any one of the first aspect to the thirteenth aspect, the attribute information may be input by a user.

According to a fifteenth aspect of the present disclosure, there is provided an information processing method including a process comprising: acquiring a group of images to which mutually independent attribute information is assigned and which are spatially or temporally continuous; and displaying a slider bar for receiving an operation of selecting an image to be displayed on a display among the group of images, on the display by changing a display form based on the attribute information that is assigned to each of the images.

According to a sixteenth aspect of the present disclosure, there is provided an information processing program causing a computer to execute a process comprising: acquiring a group of images to which attribute information independent of each other is assigned and which are spatially or temporally continuous; and displaying a slider bar for receiving an operation of selecting an image to be displayed on a display among the group of images, on the display by changing a display form based on the attribute information that is assigned to each of the images.

With the above-described aspects, the information processing apparatus, the information processing method, and the information processing program according to the present disclosure are capable of easily designating a desired image.

DETAILED DESCRIPTION

Hereinafter, examples of an embodiment for implementing the technology of the present disclosure will be described in detail with reference to the drawings.

First Exemplary Embodiment

Figure 1:
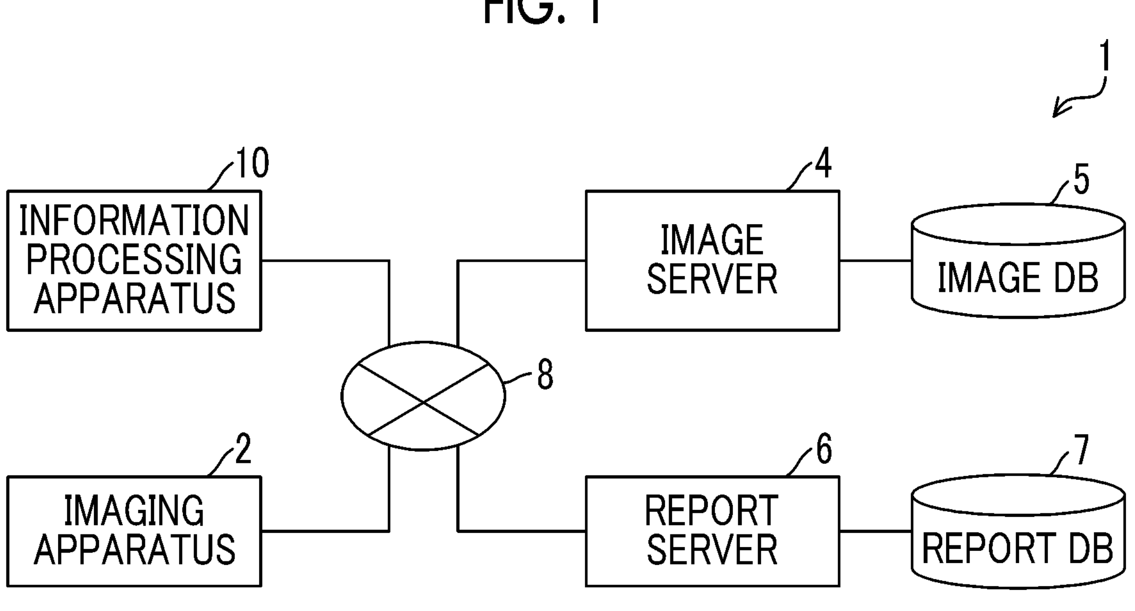
FIG. 1 is a schematic configuration diagram of an information processing system.

First, with reference to FIG. 1, an example of a configuration of an information processing system 1 according to the present exemplary embodiment will be described. FIG. 1 is a diagram showing a schematic configuration of the information processing system 1. As shown in FIG. 1, the information processing system 1 includes an imaging apparatus 2, an image server 4, an image database (DB) 5, a report server 6, a report DB 7, and an information processing apparatus 10. The imaging apparatus 2, the image server 4, the report server 6, and the information processing apparatus 10 are connected to each other via a wired or wireless network 8 in a communicable state.

The imaging apparatus 2 is an apparatus that generates a medical image G showing a diagnosis target part by imaging the diagnosis target part of a subject. Specifically, it is possible to appropriately apply a CT apparatus, an MRI apparatus, a positron emission tomography (PET) apparatus, or the like, as the imaging apparatus 2. Further, the imaging apparatus 2 transmits a captured medical image to the image server 4.

Figure 2:
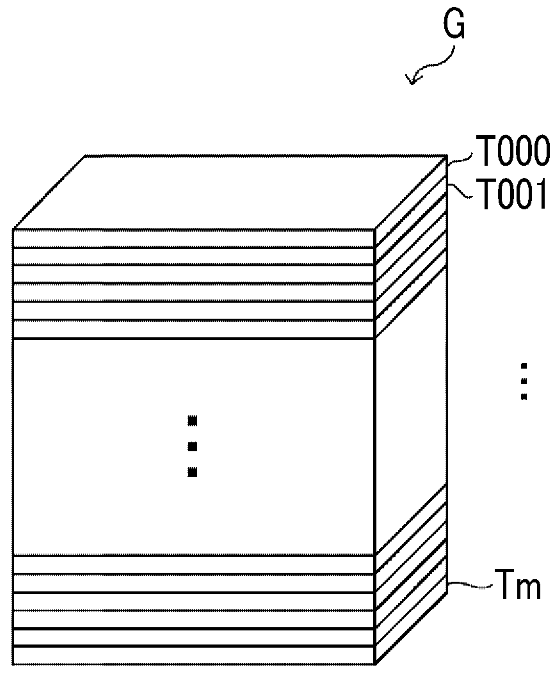
FIG. 2 is a schematic view showing an example of a medical image.

FIG. 2 is a view schematically showing an example of the medical image G. The medical image G is, for example, a CT image consisting of a plurality of tomographic images T000 to Tm (m is 001 or more) respectively representing tomographic planes from a head to a lumbar region of one subject (human body). The plurality of tomographic images T000 to Tm are examples of a plurality of images of the present disclosure. In addition, the plurality of tomographic images T000 to Tm (medical images G) are examples of a group of images that are spatially continuous. Hereinafter, in a case where each of the plurality of tomographic images T000 to Tm is not distinguished, each of the plurality of tomographic images T000 to Tm is simply referred to as "tomographic image T".

The image server 4 is a general-purpose computer on which a software program that provides a function of a database management system (DBMS) is installed. The image server 4 is connected to the image DB 5. A connection form between the image server 4 and the image DB 5 is not particularly limited, and may be a form connected by a data bus or may be a form connected via a network such as a network attached storage (NAS) and a storage area network (SAN).

The image DB 5 is realized by, for example, a storage medium such as a hard disk drive (HDD), a solid-state drive (SSD), and a flash memory. In the image DB 5, the medical image G captured by the imaging apparatus 2 and assignment information assigned to the medical image G are recorded in association with each other. The assignment information may include, for example, identification information such as an image identification (ID) for identifying the medical image G, a tomographic ID for identifying the tomographic image T, a subject ID for identifying the subject, and an examination ID for identifying an examination. In addition, the assignment information may include, for example, various types of information related to imaging such as an imaging date and time, an imaging part, a type of the imaging apparatus 2 by which the medical image G is captured, imaging conditions, and contrast conditions. In addition, the assignment information may include information related to the subject such as the name, age, and gender of the subject.

In a case where the image server 4 receives the medical image G from the imaging apparatus 2, the image server 4 prepares the medical image G in a format for a database and records the medical image G in the image DB 5. In addition, in a case where the image server 4 receives a browsing request of the medical image G from the information processing apparatus 10, the image server 4 searches for the medical image G recorded in the image DB 5, and transmits the searched for medical image G to the information processing apparatus 10 from which browsing is requested.

The report server 6 is a general-purpose computer on which a software program that provides a function of a database management system is installed. The report server 6 is connected to the report DB 7. A connection form between the report server 6 and the report DB 7 is not particularly limited, and may be a form connected by a data bus or may be a form connected via a network such as a NAS and a SAN.

The report DB 7 is realized by, for example, a storage medium such as an HDD, an SSD, and a flash memory. In the report DB 7, an image interpretation report generated based on the medical image G in the information processing apparatus 10 is recorded. The image interpretation report recorded in the report DB 7 may be an image interpretation report input by an image interpreter using the information processing apparatus 10 or may be an image interpretation report generated by a computer based on an analysis result via CAD.

In a case where the report server 6 receives the image interpretation report from the information processing apparatus 10, the report server 6 prepares the image interpretation report in a format for a database and records the image interpretation report in the report DB 7. In addition, in a case where the report server 6 receives a browsing request of the image interpretation report from the information processing apparatus 10, the report server 6 searches for the image interpretation report recorded in the report DB 7 and transmits the searched for image interpretation report to the information processing apparatus 10 from which browsing is requested.

The network 8 is, for example, a network such as a local area network (LAN) and a wide area network (WAN). Each of the imaging apparatus 2, the image server 4, the image DB 5, the report server 6, the report DB 7, and the information processing apparatus 10 included in the information processing system 1 may be disposed in the same medical institution, or may be disposed in different medical institutions. Further, in FIG. 1, each apparatus of the imaging apparatus 2, the image server 4, the image DB 5, the report server 6, the report DB 7, and the information processing apparatus 10 is shown one by one. However, the present invention is not limited thereto, and each apparatus may be composed of a plurality of apparatuses having the same functions.

The information processing apparatus 10 according to the present exemplary embodiment has a function of assisting in easily designating the desired tomographic image T in a case where the image interpretation and the diagnosis are performed, by limiting the images, among the plurality of tomographic images T captured by the imaging apparatus 2, to only the tomographic image T of interest to be displayable. Hereinafter, a detailed configuration of the information processing apparatus 10 will be described.

Figure 3:
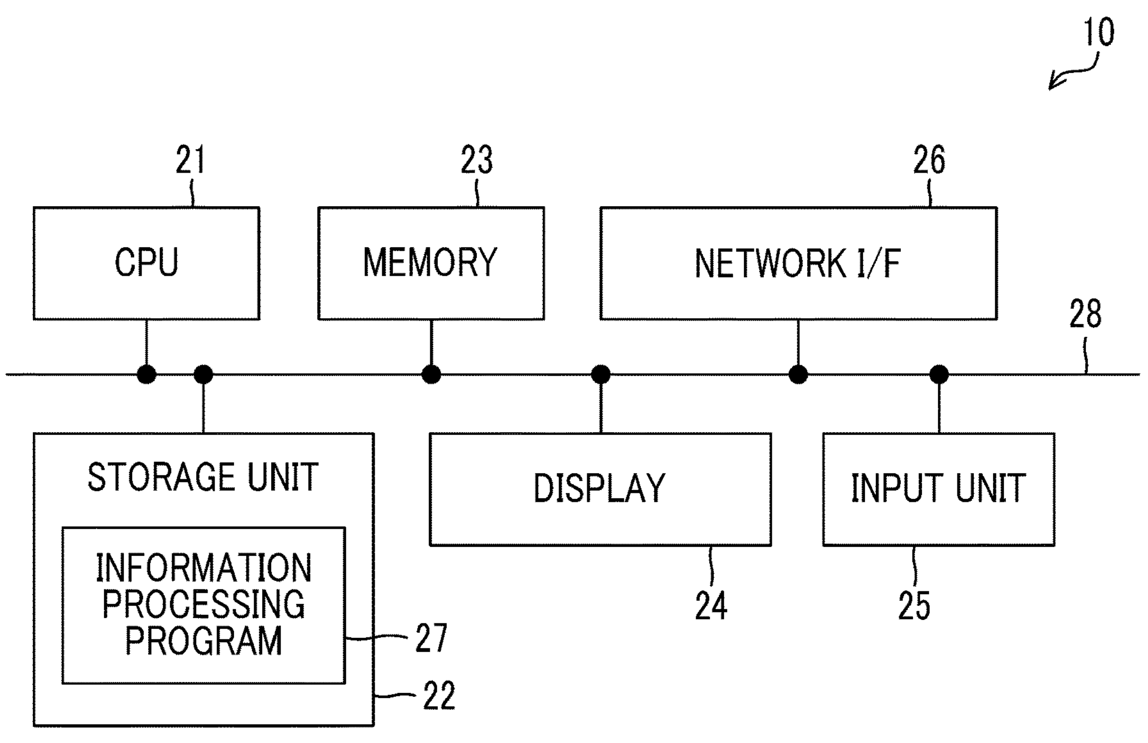
FIG. 3 is a block diagram showing an example of a hardware configuration of an information processing apparatus.

First, an example of a hardware configuration of the information processing apparatus 10 according to the present exemplary embodiment will be described with reference to FIG. 3. As shown in FIG. 3, the information processing apparatus 10 includes a central processing unit (CPU) 21, a non-volatile storage unit 22, and a memory 23 as a temporary storage area. Further, the information processing apparatus 10 includes a display 24 such as a liquid-crystal display, an input unit 25 such as a keyboard, a mouse, a touch panel, and a button, and a network interface (I/F) 26. The network I/F 26 is connected to the network 8 and performs wired or wireless communication. The CPU 21, the storage unit 22, the memory 23, the display 24, the input unit 25, and the network I/F 26 are connected to each other via a bus 28 such as a system bus and a control bus such that it is possible to exchange various types of information.

The storage unit 22 is realized by, for example, a storage medium such as an HDD, an SSD, and a flash memory. An information processing program 27 in the information processing apparatus 10 is stored in the storage unit 22. The CPU 21 reads out the information processing program 27 from the storage unit 22, loads the read-out program into the memory 23, and executes the loaded information processing program 27. The CPU 21 is an example of a processor of the present disclosure. As the information processing apparatus 10, for example, it is possible to appropriately apply a personal computer, a server computer, a smartphone, a tablet terminal, a wearable terminal, or the like.

Figure 4:
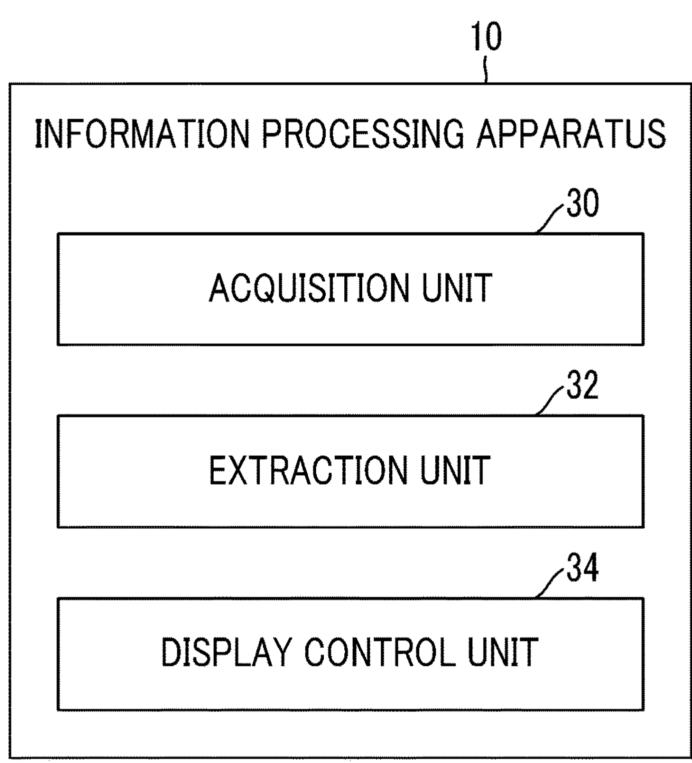
FIG. 4 is a block diagram showing an example of a functional configuration of an information processing apparatus.

Next, an example of a functional configuration of the information processing apparatus 10 according to the present exemplary embodiment will be described with reference to FIG. 4. As shown in FIG. 4, the information processing apparatus 10 includes an acquisition unit 30, an extraction unit 32, and a display control unit 34. By executing the information processing program 27 with the CPU 21, the CPU 21 functions as the acquisition unit 30, the extraction unit 32, and the display control unit 34.

Figures 5, 6:
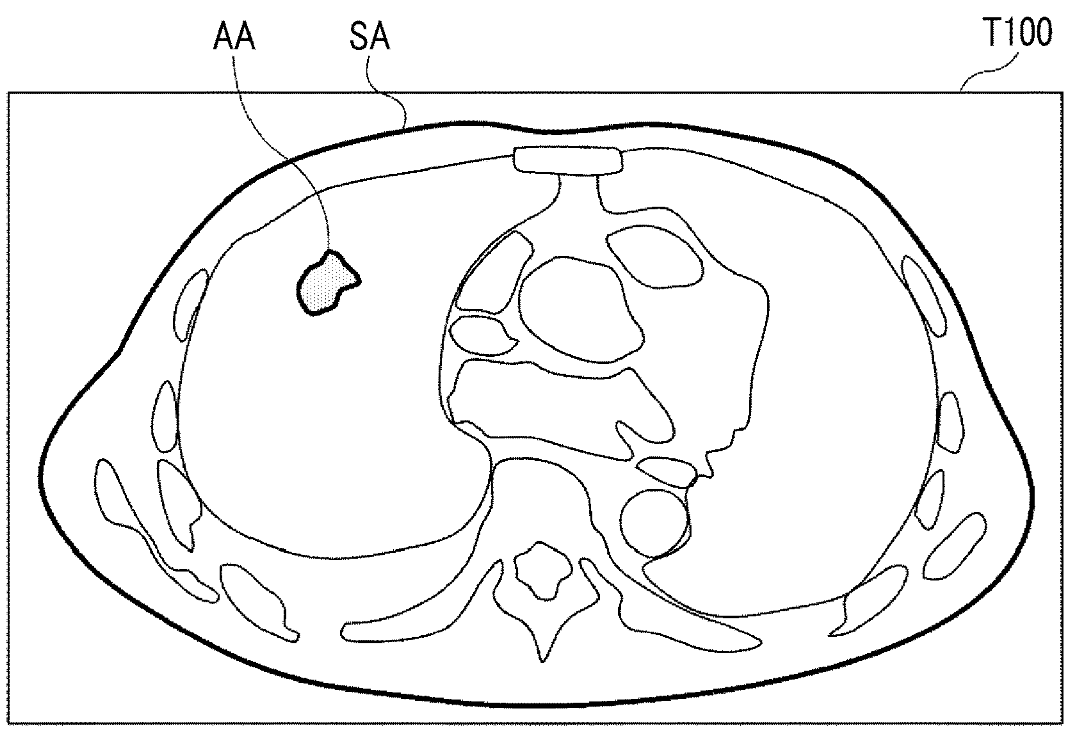
FIG. 5 is a diagram showing an example of a tomographic image.
FIG. 6 is a diagram showing an example of attribute information.

The acquisition unit 30 acquires the plurality of tomographic images T from the image server 4. As described above, the tomographic image T is an image showing a tomographic plane of the human body. Accordingly, each tomographic image T includes a region (hereinafter, referred to as a "structure area SA") of a structure showing various organs (for example, brain, lung, liver, and the like) of the human body, various tissues constituting various organs (for example, blood vessels, nerves, muscles, and the like), and the like. In addition, each tomographic image T may include a region of an abnormal shadow such as lesions (for example, tumor, injury, defect, nodule, inflammation, and the like), and a region (hereinafter, referred to as an "abnormal area AA") such as a region obscured by imaging. FIG. 5 shows a tomographic image T100 of a lung as an example of the tomographic image T. In the tomographic image T100, a lung region is the structure area SA, and a nodule region is the abnormal area AA.

The extraction unit 32 extracts a region of interest with respect to each of the plurality of tomographic images T. The region of interest is a region of attention in image interpretation and diagnosis, and is, for example, at least one of the structure area SA or the abnormal area AA. That is, each of the plurality of tomographic images T includes the region of interest. As an extraction method of the region of interest, it is possible to appropriately apply a known method using an artificial intelligence (AI) technology, a known method using image processing, or the like. For example, the region of interest may be extracted from the tomographic image T by using a trained model trained such that the tomographic image T is set to be input and the region of interest is extracted and output. Further, for example, edges of the structure area SA and of the abnormal area AA may be specified and may be extracted as regions of interest, by performing image processing such as binarization, background removal, and edge enhancement with respect to the tomographic image T.

Further, the extraction unit 32 generates attribute information indicating an attribute of the extracted region of interest and assigns the attribute information to the tomographic image T from which the region of interest is extracted. That is, mutually independent attribute information is assigned to each of the plurality of tomographic images T. The attribute information is, for example, information indicating a type of the region of interest, specifically, information indicating a type of structure represented by the structure area SA included in the tomographic image T, and indicating a type of lesion represented by the abnormal area AA included in the tomographic image T or the like. As a specifying method of the type of the region of interest by the extraction unit 32, it is possible to appropriately apply a known specifying method using CAD.

FIG. 6 shows an example of the attribute information that is generated by the extraction unit 32 and that is assigned to each of the plurality of tomographic images T. A column of "tomographic ID" of FIG. 6 indicates identification information of the tomographic images T allocated in order from a head side to a lumbar side of a subject to be examined. A column of "organ" indicates attribute information indicating the type of the organ represented by the structure area SA extracted from the tomographic image T. The columns of "lesion 1" to "lesion 3" indicate attribute information indicating the type of lesion represented by the abnormal area AA extracted from the tomographic image T. As shown in FIG. 6, a plurality of pieces of attribute information may be assigned, only one piece of attribute information may be assigned, or no one piece of attribute information may be assigned, with respect to one tomographic image T.

Figure 7:
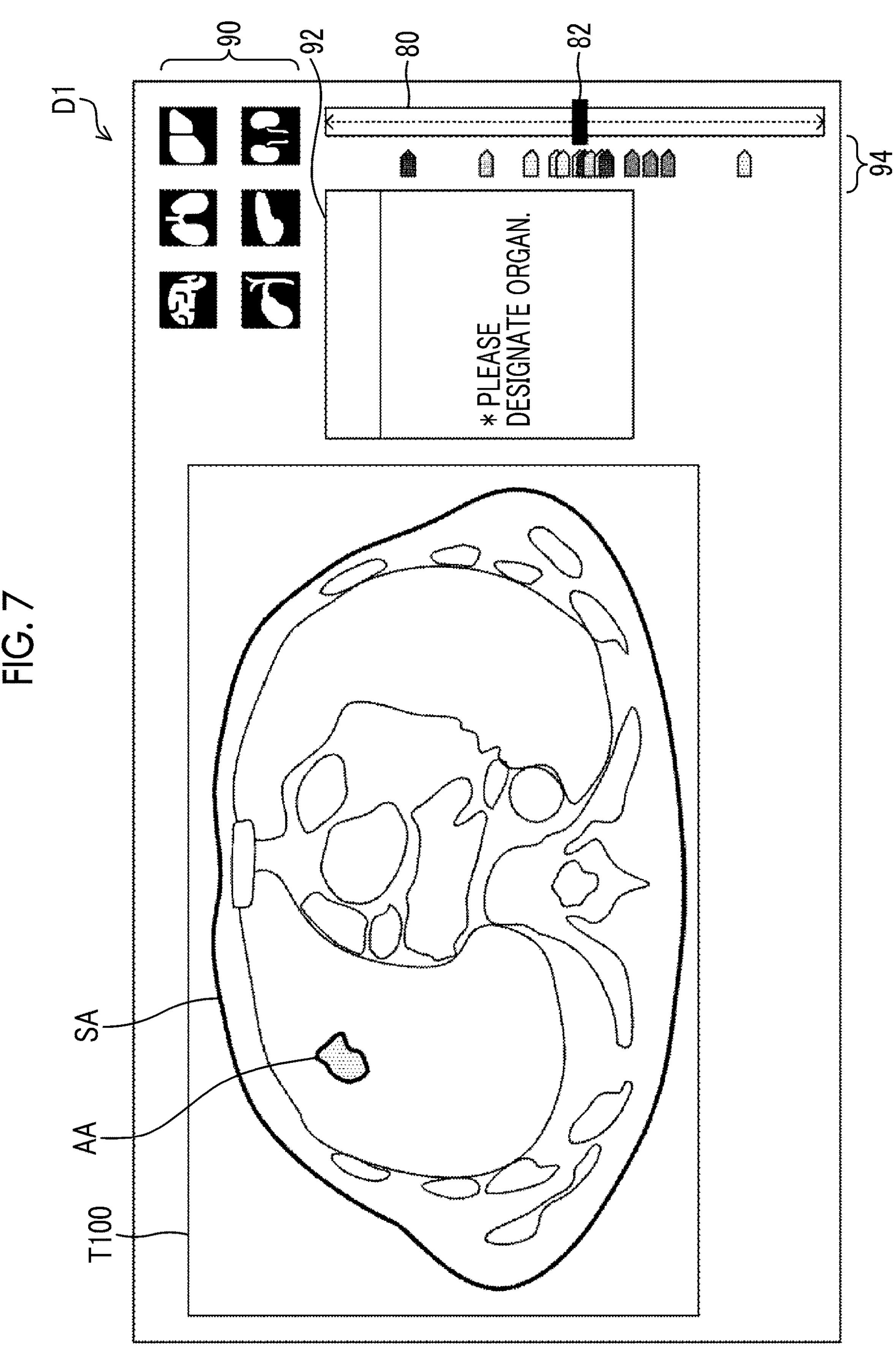
FIG. 7 is a diagram showing an example of a screen displayed on a display.

The display control unit 34 performs control in which a screen for checking the tomographic image T for a user such as doctor interpreting an image is displayed on the display 24. FIG. 7 is an example of a screen D1 displayed on the display 24 by the display control unit 34. The screen D1 includes a slider bar 80 for receiving an operation of selecting the tomographic image T to be displayed on the display 24 among the plurality of tomographic images T. The slider bar 80 is a graphical user interface (GUI) component that is also called a slide bar or a scroll bar. An example of the screen D1 corresponds to a plurality of tomographic images T arranged in order from a head side to a lumbar side from an upper end to a lower end. The display control unit 34 receives an operation of a position of a slider 82 on the slider bar 80 by the user via the input unit 25, and displays, on the screen D1, one tomographic image T (the tomographic image T100 in the example of FIG. 7) corresponding to the position of the slider 82 among the plurality of tomographic images T. A dotted arrow added to the slider 82 in FIG. 7 means a movable range of the slider 82 on the slider bar 80, and the entire slider bar 80 is the movable range of the slider 82 in the example of FIG. 7.

In addition, the display control unit 34 displays markers 94 having different forms according to the attribute information assigned to each of the tomographic images T at corresponding positions of the slider bar 80. The screen D1 of FIG. 7 includes the markers 94 having different forms disposed on a side of the slider bar 80. The marker 94 is for indicating a position on the slider bar 80 of the tomographic image T (that is, the tomographic image T including the lesion) from which the abnormal area AA is extracted among the plurality of tomographic images T. A form of the marker 94 is determined according to the attribute information indicating the type of lesion, which is assigned to the tomographic image T (refer to FIG. 8). For example, the marker 94 may be color-coded according to the attribute information indicating the type of the lesion.

Meanwhile, in the field of actual image interpretation and diagnosis, there is a case where a structure and/or a lesion for which interpretation and diagnosis are desired is predetermined and where it is sufficient that only the tomographic image T including the structure and/or the lesion is displayed on the display 24. Therefore, there is a demand for a technology in which it is possible to easily select the tomographic image T to be displayed on the display 24, that is, the tomographic image T including a structure and/or a lesion for which interpretation and diagnosis are desired.

Therefore, the display control unit 34 limits the images, among the plurality of tomographic images T, to the tomographic images T that are displayable on the display 24 based on the attribute information generated by the extraction unit 32. Specifically, the display control unit 34 performs control where only the tomographic image T to which designated attribute information is assigned among the plurality of tomographic images T is set to be displayable.

Figure 8:
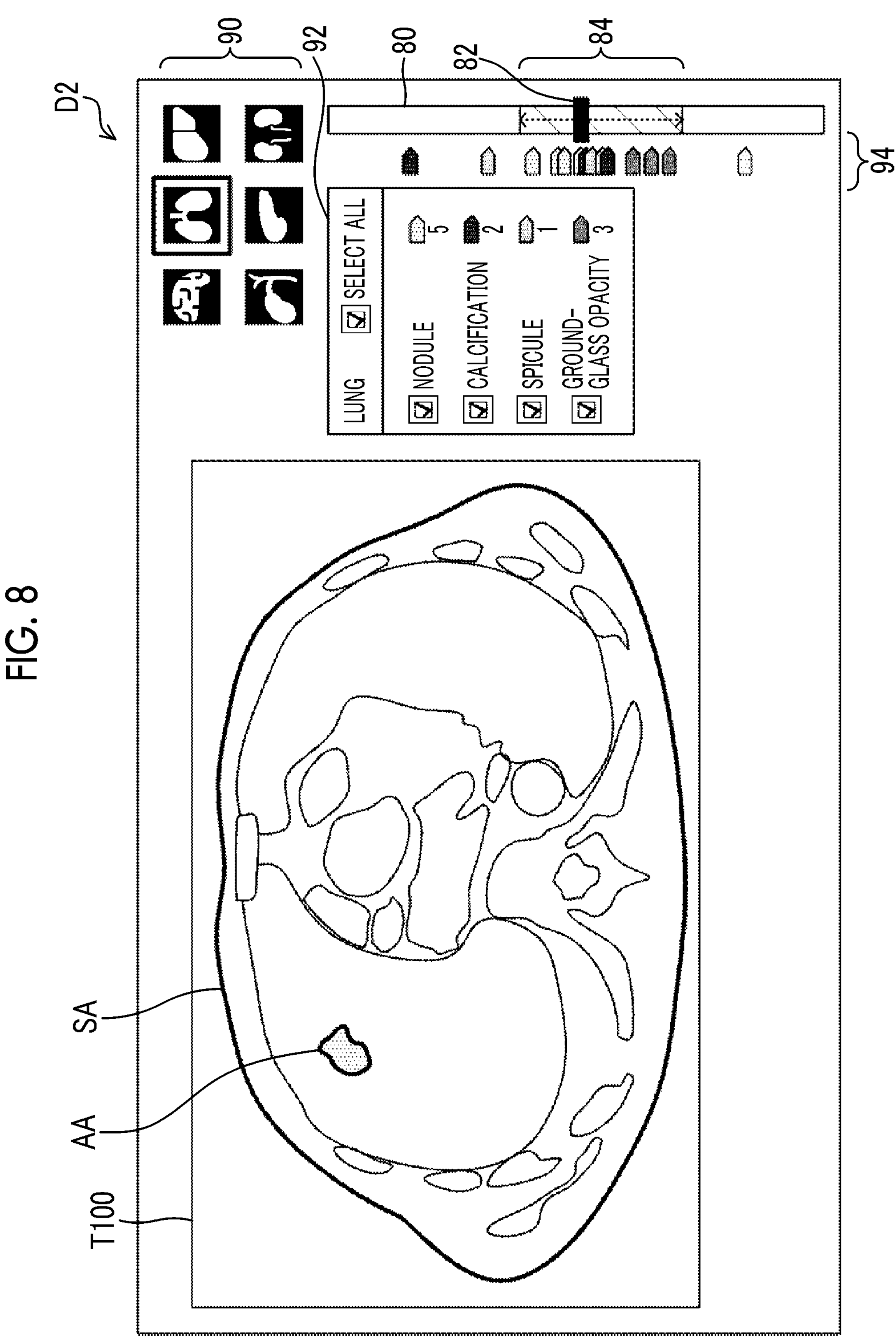
FIG. 8 is a diagram showing an example of a screen displayed on the display.
Figure 9:
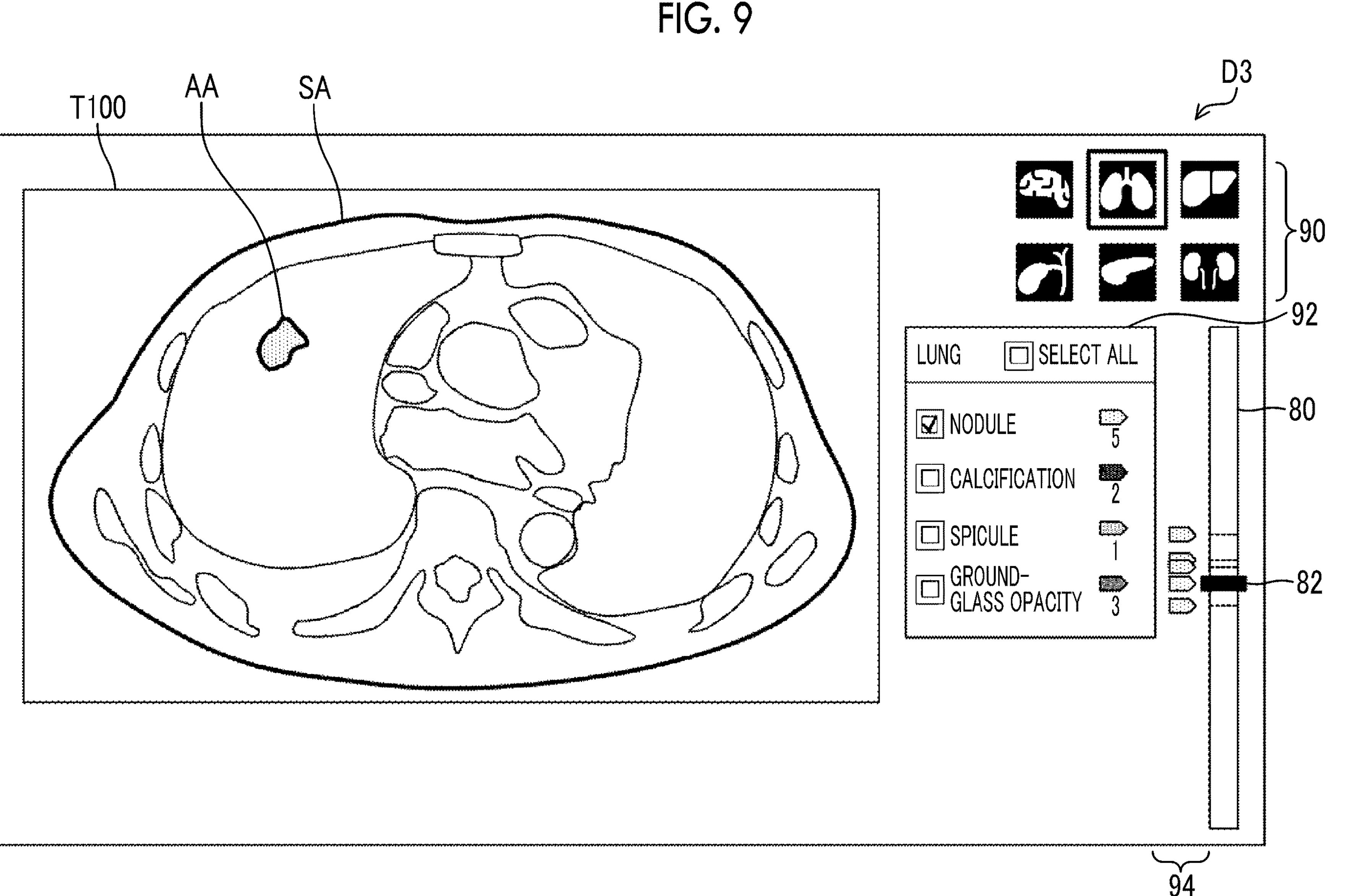
FIG. 9 is a diagram showing an example of a screen displayed on the display.

A specific example of processing by the display control unit 34 will be described with reference to FIGS. 7 to 9. In the present exemplary embodiment, an aspect in which, among the plurality of tomographic images T, the images are limited to the tomographic images T that are displayable on the display 24 by limiting the operable range of the slider bar 80 based on the attribute information will be described. Here, the "operable range of the slider bar 80" may include a portion corresponding to at least one tomographic image T on the slider bar 80, but is not limited to one range and portion, and may include a plurality of discontinuous ranges and portions.

First, the display control unit 34 may determine the tomographic image T that is displayable on the display 24 according to the attribute information (refer to FIG. 6) indicating a type of an organ included in the tomographic image T. The screen D1 of FIG. 7 includes an organ designation field 90 for receiving a designation of the type of the organ. The display control unit 34 displays various organs (for example, brain, lung, liver, gall bladder, pancreas, kidney, and the like) in the organ designation field 90 as designatable icons, and receives a designation of at least one type of organ from the user.

In a case where at least one icon in the organ designation field 90 is designated by the user via the input unit 25, the display control unit 34 limits the operable range of the slider bar 80 such that only the tomographic image T to which the attribute information indicating the organ indicated by the designated icon is assigned is set to be selectable. FIG. 8 shows an example of a screen D2 displayed on the display 24 by the display control unit 34 in a case where an icon indicating "lung" is designated in the organ designation field 90 of the screen D1. In the slider bar 80 on the screen D2, the movable range of the slider 82 (shown by a dotted arrow) is limited such that only the tomographic image T to which the attribute information (refer to FIG. 6) indicating the "lung" is assigned is set to be selectable. As shown on the screen D2, the display control unit 34 may highlight the movable range of the slider 82 (that is, the operable range of the slider bar 80) by changing a background color or the like.

Second, the display control unit 34 may determine the tomographic image T that is displayable on the display 24 according to the attribute information (refer to FIG. 6) indicating a type of a lesion included in the tomographic image T. The screen D2 of FIG. 8 includes a lesion designation field 92 for receiving a designation of a type of lesion related to the "lung" designated in the organ designation field 90. The display control unit 34 displays various lesions (for example, a nodule, a calcification, a spicule, a ground-glass opacity, and the like) in the lesion designation field 92 as selectable check boxes, and receives a designation of at least one type of lesion by the user. In addition, the lesion designation field 92 of FIG. 8 also includes the marker 94 corresponding to each lesion and the number of tomographic images T to which attribute information indicating each lesion is assigned.

In a case where at least one lesion in the lesion designation field 92 is designated by the user via the input unit 25, the display control unit 34 limits the operable range of the slider bar 80 such that only the tomographic image T to which the attribute information indicating the designated lesion is assigned is set to be selectable. FIG. 9 shows an example of a screen D3 displayed on the display 24 by the display control unit 34 in a case where "nodule" is designated in the lesion designation field 92 of the screen D2. In the slider bar 80 on the screen D3, the movable range of the slider 82 (shown by a dotted line) is limited such that only the tomographic image T to which the attribute information (refer to FIG. 6) indicating the "nodule" is assigned is set to be selectable.

In addition, the display control unit 34 may perform control of displaying the marker 94 at a position corresponding to the slider bar 80 with respect to the tomographic image T to which the designated attribute information is assigned. That is, the display control unit 34 may perform control of displaying only the marker 94 corresponding to the designated attribute information. In the example of the screen D3 of FIG. 9, the marker 94 is displayed at the position corresponding to the slider bar 80 with respect to the tomographic image T to which the attribute information indicating the designated "nodule" is assigned.

Figure 10:
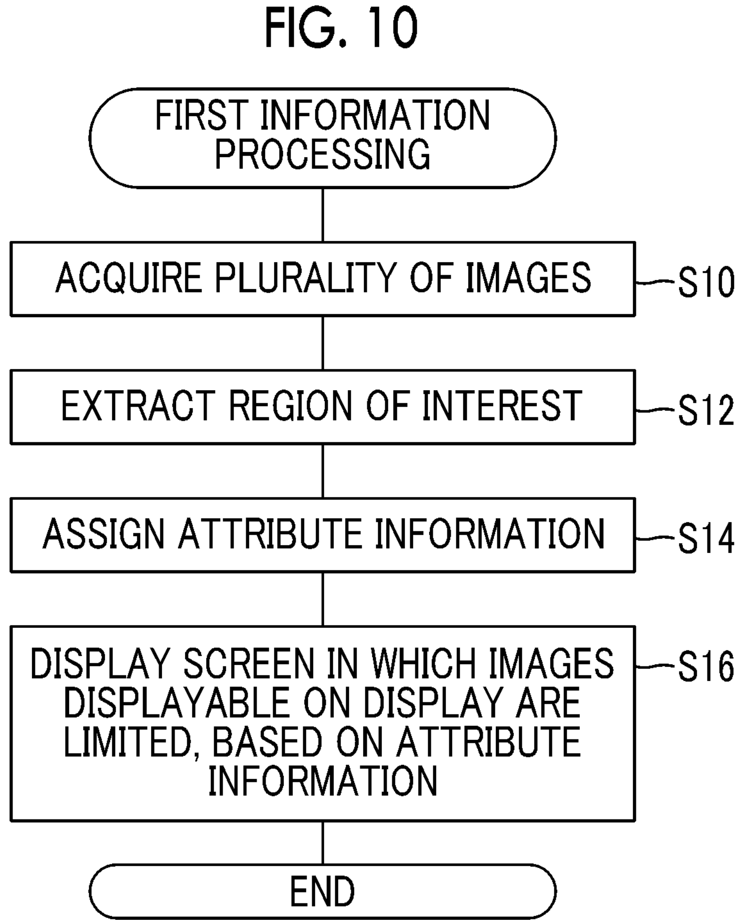
FIG. 10 is a flowchart showing an example of first information processing.

Next, an operation of the information processing apparatus 10 according to the present exemplary embodiment will be described with reference to FIG. 10. In the information processing apparatus 10, the CPU 21 executes the information processing program 27, so that first information processing shown in FIG. 10 is executed. The first information processing is executed, for example, in a case where the user gives an instruction to start execution via the input unit 25.

In Step S10, the acquisition unit 30 acquires the plurality of images (tomographic images T) from the image server 4. In Step S12, the extraction unit 32 extracts the region of interest from each of the plurality of images acquired in Step S10. In Step S14, the extraction unit 32 generates attribute information indicating an attribute of the region of interest extracted in Step S12 and assigns the attribute information to an image from which the region of interest is extracted. In step S16, the display control unit 34 displays a screen in which images that are displayable on the display 24 are limited on the display 24 based on the attribute information assigned in Step S14, and terminates the first information processing.

As described above, according to an aspect of the present disclosure, there is provided an information processing apparatus 10 comprising: at least one processor, in which the processor acquires a plurality of images to which mutually independent attribute information is assigned, and limits the images, among the plurality of images, to images that are displayable on a display based on the attribute information. That is, according to the information processing apparatus 10 according to the present exemplary embodiment, it is possible to limit the images, among the plurality of tomographic images T, to only the tomographic image T of interest to be displayable, so that it is possible to easily designate the desired tomographic image T in a case where the image interpretation and the diagnosis are performed.

In a first exemplary embodiment, an aspect in which the display control unit 34 performs control such that only the tomographic image T to which the designated attribute information is assigned among the plurality of tomographic images T is set to be displayable has been described. However, the present invention is not limited thereto. The display control unit 34 may perform control of setting only the tomographic image T in a range determined based on the designated attribute information to be displayable. For example, the display control unit 34 may limit the operable range of the slider bar 80 such that all the tomographic images T included in a range from a first (that is, the most head side) tomographic image T to which the designated attribute information is assigned, to a last (that is, the most lumbar side) tomographic image T to which the designated attribute information is assigned are set to be selectable. In this case, the tomographic image T to which the designated attribute information is not assigned may be included in the displayable tomographic image T. According to the above-described embodiment, even in a case where there is an omission of assignment of the attribute information, it is possible to set the tomographic image T having a relatively high probability that the attribute information for which display is desired is assigned, as a display target.

In addition, the display control unit 34 may perform control of setting the tomographic image T with which the designated attribute information is pre-associated and to which designated attribute information is assigned, to be displayable. For example, in a case where the attribute information indicating the "nodule" is designated, the display control unit 34 may perform control of setting the tomographic image T to which the attribute information indicating the "lung" is assigned, to be displayable. For example, in a case where the attribute information indicating the "lung" is designated, the display control unit 34 may perform control of setting only the tomographic image T to which attribute information indicating any lesion is assigned, among the tomographic images T to which the attribute information indicating the "lung" is assigned, to be displayable.

In addition, in the first exemplary embodiment, an aspect in which the display control unit 34 limits the operable range of the slider bar 80, so that, among the plurality of tomographic images T, the images are limited to the tomographic images T that are displayable on the display 24 has been described; however, the present invention is not limited thereto. For example, in a case where the display control unit 34 displays tomographic IDs of all the tomographic images T on the display 24 in a list format, the display control unit 34 may perform control of displaying only the tomographic IDs of the tomographic images T to which designated attribute information is assigned.

Second Exemplary Embodiment

The information processing apparatus 10 according to a second exemplary embodiment has a function of assisting in easily designating the desired tomographic image T in a case where the image interpretation and the diagnosis are performed, by changing a form of the slider bar 80 such that, among the plurality of tomographic images T, the tomographic image T of interest is easily selected. Since a configuration of the information processing system 1 according to the present exemplary embodiment is the same as that of the first exemplary embodiment, the description thereof will be omitted. Further, since the hardware configuration and functions of the acquisition unit 30 and the extraction unit 32 with respect to the information processing apparatus 10 according to the present exemplary embodiment are the same as those in the above-described first exemplary embodiment, the description thereof will be omitted.

The display control unit 34 displays the slider bar 80 for receiving an operation of selecting the tomographic image T to be displayed on the display 24 among a group of tomographic images T acquired by the acquisition unit 30, on the display 24 by changing a display form based on the attribute information that is assigned to each of the tomographic images T. Specifically, the display control unit 34 enlarges a portion of the slider bar 80 corresponding to the tomographic image T in a range determined based on the designated attribute information among the group of tomographic images T and displays the portion of the slider bar 80 on the display 24.

Figure 11:
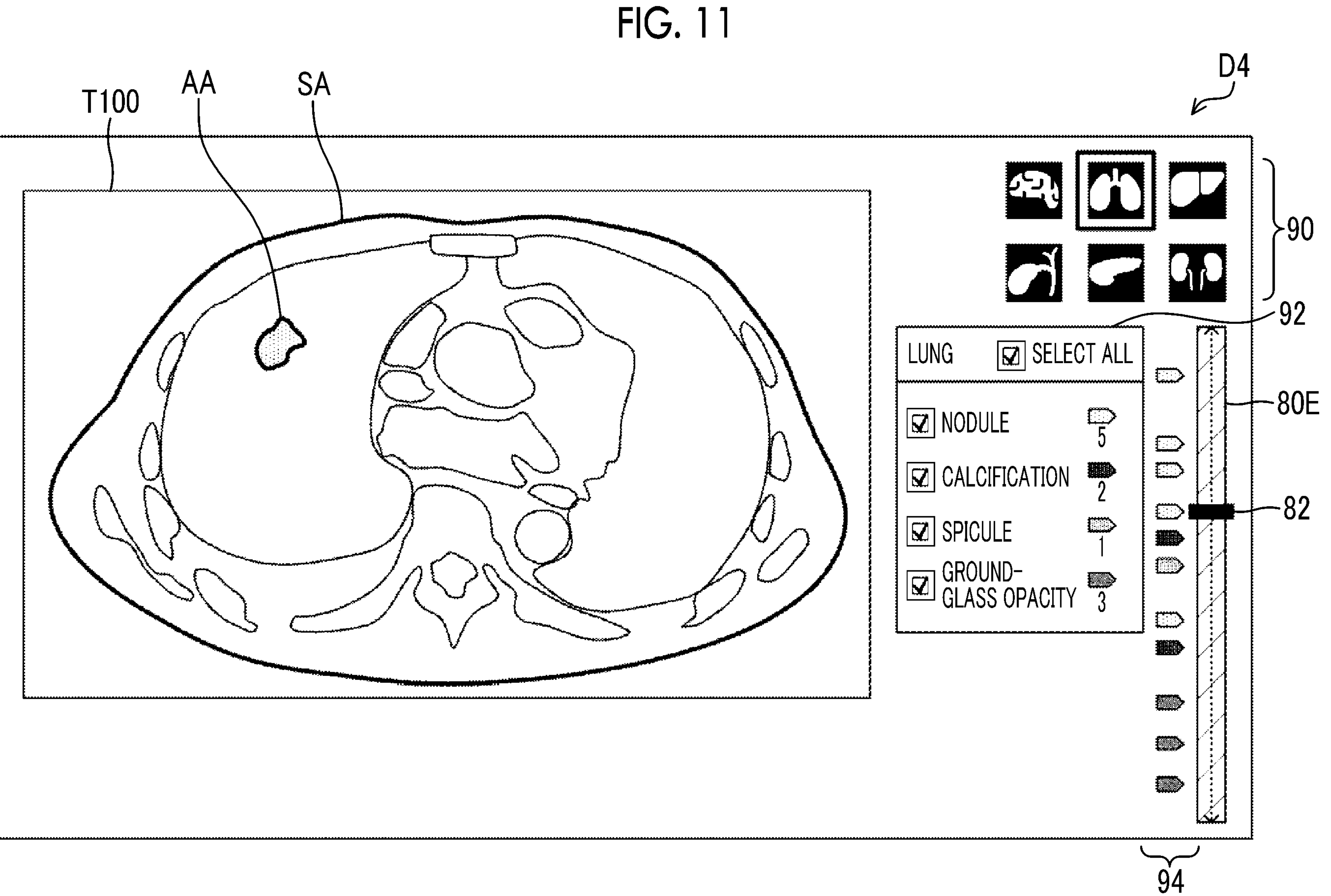
FIG. 11 is a diagram showing an example of a screen displayed on the display.

A specific example of processing by the display control unit 34 will be described with reference to FIG. 11. FIG. 11 shows an example of a screen D4 displayed on the display 24 by the display control unit 34. The screen D4 is a screen displayed on the display 24 by the display control unit 34 in a case where the attribute information indicating the "lung" is designated, similarly to the screen D2 (refer to FIG. 8) described in the first exemplary embodiment. The screen D4 includes the tomographic image T100, the organ designation field 90, the lesion designation field 92, and the marker 94 similar to that of the screen D2.

A slider bar 80E on the screen D4 is an enlarged portion 84 (refer to FIG. 8) of the slider bar 80 on the screen D2. The portion 84 is a portion of the slider bar 80 corresponding to the tomographic image T to which the attribute information indicating the "lung" is assigned. The slider bar 80E corresponds to, from an upper side to a lower side, the plurality of tomographic images T, from the first (that is, the most head side) tomographic image T to which the attribute information indicating "lung" is assigned, to the last (that is, the most lumbar side) tomographic image T to which the attribute information indicating the "lung" is assigned. According to the enlarged slider bar 80E, it is possible to receive a selection of the tomographic image T by effectively utilizing the upper end to the lower end of the slider bar 80E.

In addition, the display control unit 34 also changes a position of the marker 94 in response to enlargement of the portion 84 of the slider bar 80. As shown on the screen D2, there is a case where the attribute information is assigned to a large number of tomographic images T, so that the markers 94 are densely gathered and visibility thereof is reduced. However, as shown on the screen D4, it is possible to improve the visibility of the marker 94, by changing the position of the marker 94 in response to the enlargement of the portion 84 of the slider bar 80 by the display control unit 34.

Figure 12:
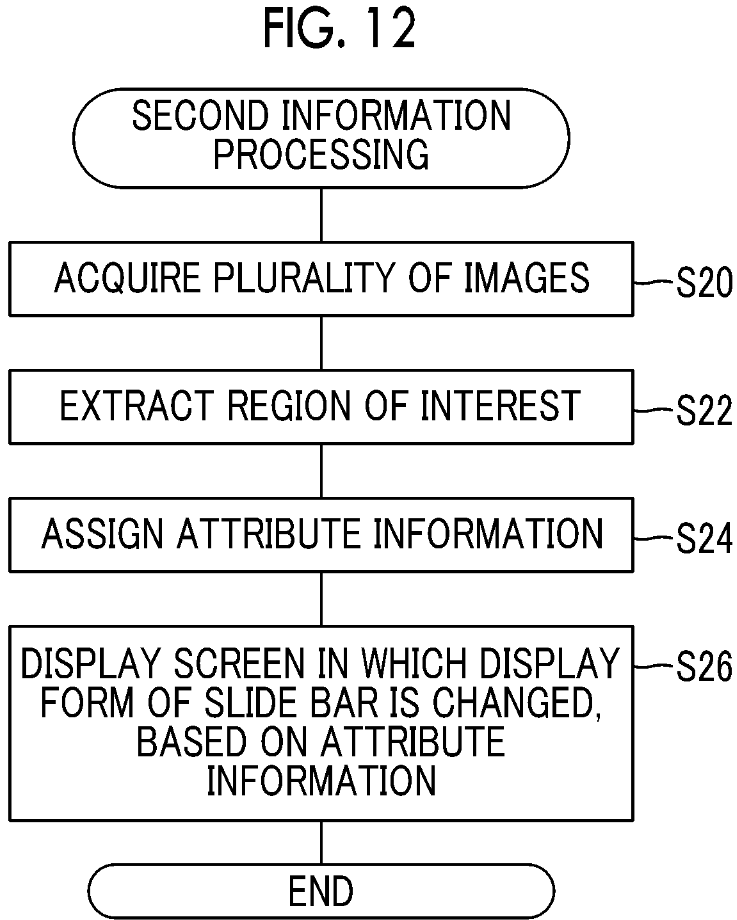
FIG. 12 is a flowchart showing an example of second information processing.

Next, the operation of the information processing apparatus 10 according to the present exemplary embodiment will be described with reference to FIG. 12. In the information processing apparatus 10, the CPU 21 executes the information processing program 27, so that the second information processing shown in FIG. 12 is executed. The second information processing is executed, for example, in a case where the user gives an instruction to start execution via the input unit 25.

In Step S20, the acquisition unit 30 acquires a group of images (tomographic images T) from the image server 4. In Step S22, the extraction unit 32 extracts the region of interest from each of the group of images acquired in Step S20. In Step S24, the extraction unit 32 generates attribute information indicating the attribute of the region of interest extracted in Step S22 and assigns the attribute information to the image from which the region of interest is extracted. In Step S26, the display control unit 34 displays a screen in which the display form of the slider bar 80 is changed on the display 24 based on the attribute information assigned in Step S24, and terminates the second information processing.

As described above, according to an aspect of the present disclosure, there is provided an information processing apparatus 10 comprising: at least one processor, in which the processor acquires a group of images to which mutually independent attribute information is assigned and which are spatially or temporally continuous, and displays a slider bar for receiving an operation of selecting an image to be displayed on a display among the group of images, on the display by changing a display form based on the attribute information that is assigned to each of the images. That is, according to the information processing apparatus 10 of the present exemplary embodiment, since the display form of the slider bar 80 is changed such that, among the plurality of tomographic images T, the tomographic image T of interest is easily selected, it is possible to easily designate the desired tomographic image T in a case where the image interpretation and the diagnosis are performed. In addition, since the position of the marker 94 is also changed in accordance with the change of the display form of the slider bar 80, it is possible to improve the visibility of the marker 94 and to more easily designate the desired tomographic image T.

Figure 13:
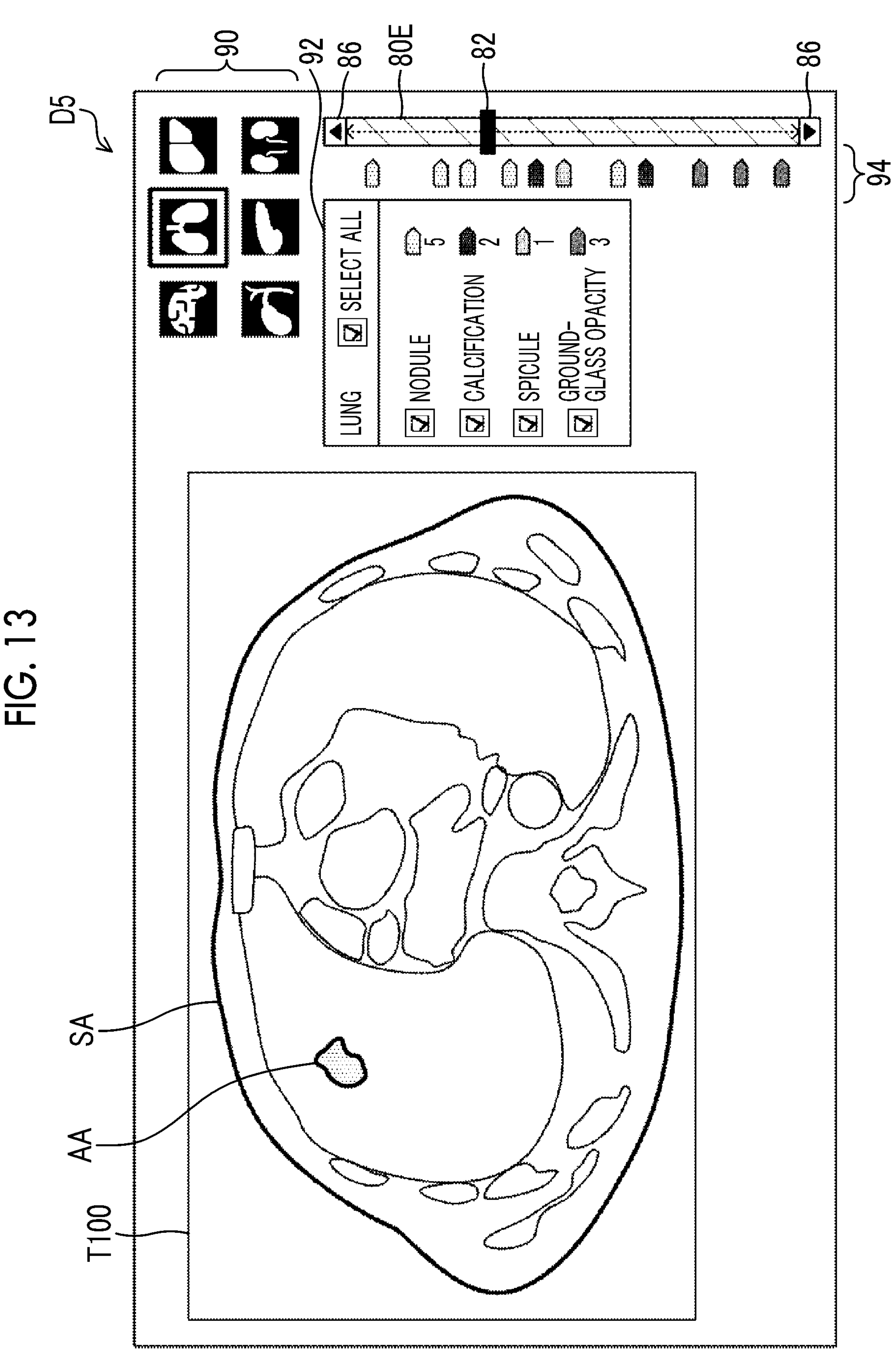
FIG. 13 is a diagram showing an example of a screen displayed on the display.

It should be noted that, in the second exemplary embodiment, unlike in the first exemplary embodiment, the display control unit 34 may not limit the tomographic image T that is displayable on the display 24. FIG. 13 shows an example of a screen D5 as a modification example of the screen D4 of FIG. 11. On the screen D5, arrows 86 are added to the upper end and the lower end of the slider bar 80E on the screen D4. By operating the arrow 86 at the upper end, it is possible to move an enlargement range of the slider bar 80E to correspond to the tomographic image T closer to the head side. Similarly, by operating the arrow 86 at the lower end, it is possible to move an enlargement range of the slider bar 80E to correspond to the tomographic image T closer to the lumbar side.

In each of the above exemplary embodiments, an aspect in which the extraction unit 32 extracts the region of interest has been described, but the present disclosure is not limited thereto. The region of interest may be a region that is included in the tomographic image T and that is designated by the user. For example, the display control unit 34 displays the tomographic image T on the display 24 and receives a designation of coordinates on the tomographic image T from the user via the input unit 25, so that the display control unit 34 may determine the region of interest in the tomographic image T.

Further, in each of the above exemplary embodiments, the extraction unit 32 may extract various regions of interest by combining a plurality of extraction methods of the region of interest. For example, the extraction unit 32 may extract the region of a structure as the structure area SA and may use trained models for each organ that are pre-trained to extract various lesions as the abnormal area AA by combining the trained models for each organ. Further, for example, the extraction unit 32 may combine a plurality of image processing filters that are suitable for each abnormal shadow to use. In these cases, the extraction unit 32 applies various extraction methods to each of the plurality of tomographic images T, so that it is possible to extract various regions of interest from each of the plurality of tomographic images T.

Further, in each of the above exemplary embodiments, an example in which information indicating the type of the region of interest extracted by the extraction unit 32 is used as the attribute information has been described; however, the present invention is not limited thereto. It is possible that the display control unit 34 limits the images, among the plurality of tomographic images T, to the tomographic images T that are displayable on the display 24 or changes the display form of the slider bar 80, based on other attribute information. Hereinafter, another example of the attribute information will be described.

First, as described above, in a case where the extraction unit 32 applies a plurality of different extraction methods in extraction of the region of interest, the extraction unit 32 may assign information indicating the extraction method used for extracting the region of interest to the tomographic image T from which the region of interest is extracted, as attribute information. For example, in a case where a plurality of trained models different for each organ are used in combination, attribute information indicating a trained model for a brain may be assigned to the tomographic image T in which a region of the brain is extracted as the structure area SA by the trained model for a brain, and attribute information indicating a trained model for a lung may be assigned to the tomographic image T in which a region of the lung is extracted as the structure area SA by the trained model for a lung.

Second, the extraction unit 32 may generate the attribute information based on a feature amount of the extracted region of interest. As described above, the abnormal area AA is a region including an abnormal shadow such as a lesion and a region obscured by imaging. Specifically, the abnormal shadow is discriminated by the fact that a pixel value is different from a normal value or that the shape of an edge is abnormal. Therefore, for example, the extraction unit 32 may generate attribute information indicating features of abnormal shadows such as "high concentration", "low concentration", and "uneven".

Third, the attribute information may be information indicating a purpose for imaging the tomographic image T. The purpose for which the tomographic image T is captured is, for example, a thorough examination, a regular medical examination, a follow-up observation, and the like. The information indicating the purpose for which the tomographic image T is captured may be acquired by, for example, the acquisition unit 30 from a management server that manages an examination order, an electronic medical record, and the like.

Fourth, the attribute information may be information input by the user via the input unit 25. The information input by the user may be the above-described various pieces of attribute information, for example, or may be information different from the above-described various pieces of attribute information such as the user's own comments.

Further, in each of the above exemplary embodiments, an aspect in which the extraction unit 32 assigns the attribute information to the plurality of tomographic images T during processing of displaying the tomographic image T on the display 24 has been described, but the present invention is not limited thereto. For example, the attribute information may be assigned to each of the plurality of tomographic images T in advance, and the plurality of tomographic images T to which the attribute information is assigned may be recorded in the image DB 5. In this case, in the process of displaying the tomographic image T on the display 24, it is possible for the acquisition unit 30 to acquire the plurality of tomographic images T to which the attribute information is assigned in advance, so that it is possible to omit processing of assigning the attribute information by the extraction unit 32.

In each of the above exemplary embodiments, it has been described that the forms of the markers 94 differ depending on the attribute information, but the present invention is not limited thereto. For example, regardless of the type of lesion, the display control unit 34 may perform control in which the marker 94 having one form is displayed at the position corresponding to the slider bar 80, with respect to the tomographic image T to which attribute information indicating some lesion is assigned.

Further, in each of the above exemplary embodiments, an aspect in which the marker 94 is included in a screen displayed on the display has been described, but it is possible to omit the marker 94. Even in a case where the marker 94 is omitted, according to the information processing apparatus 10 of the first exemplary embodiment, since, among the plurality of tomographic images T, the images are limited to only the tomographic image T of interest to be displayable, an effect in which it is possible to easily designate the desired tomographic image T is obtained. Similarly, even in a case where the marker 94 is omitted, according to the information processing apparatus 10 of the second exemplary embodiment, since the display form of the slider bar 80 is changed according to the attribute information, an effect in which it is possible to easily designate the desired tomographic image T is obtained.

Further, in each of the above exemplary embodiments, an example in which a plurality of tomographic images T (medical images G) are targeted has been described, but in the technology of the present disclosure, it is also possible to target other images. For example, a group of temporally continuous images such as a moving image captured by a digital camera, a surveillance camera, a drive recorder, or the like may be targeted. Even in a case where the above-described moving image is targeted, it is possible for the extraction unit 32 to extract, for example, a region of a structure such as a person, an animal, and an automobile as the region of interest, and to generate the attribute information to be assigned.

In each of the above exemplary embodiments, for example, as hardware structures of processing units that execute various kinds of processing, such as the acquisition unit 30, the extraction unit 32, and the display control unit 34, it is possible to use various processors shown below. The various processors include a programmable logic device (PLD) that is a processor of which the circuit configuration can be changed after manufacture, such as a field-programmable gate array (FPGA), a dedicated electrical circuit that is a processor having a circuit configuration dedicatedly designed to perform specific processing, such as an application-specific integrated circuit (ASIC), and the like in addition to a CPU that is a general-purpose processor functioning as various processing units by executing software (programs) as described above.

One processing unit may be configured of one of the various processors, or may be configured of a combination of the same or different kinds of two or more processors (for example, a combination of a plurality of FPGAs or a combination of the CPU and the FPGA). The plurality of processing units may be constituted by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). In this way, as the hardware structure, the various processing units are configured by using one or more of the various processors described above.

In addition, specifically, an electric circuit (circuitry) obtained by combining circuit elements, such as semiconductor elements, can be used as the hardware structure of the various processors.

Further, in each of the above exemplary embodiments, the aspect in which the information processing program 27 is stored (installed) in the storage unit 22 in advance has been described, but the present invention is not limited thereto. The information processing program 27 may be provided in a form in which the programs are recorded in a recording medium such as a compact disc read only memory (CD-ROM), a digital versatile disc read-only memory (DVD-ROM), and a Universal Serial Bus (USB) memory. In addition, the information processing program 27 may be downloaded from an external device via a network. Further, the technology of the present disclosure extends to a storage medium for storing the information processing program non-transitorily in addition to the information processing program.

The technology of the present disclosure can also appropriately combine the above-described exemplary embodiments. The contents of the above description and the contents of the drawings are detailed descriptions of portions according to the technology of the present disclosure, and are merely examples of the technology of the present disclosure. For example, the above explanations related to configurations, functions, actions, and effects are explanations related to examples of configurations, functions, actions, and effects of the parts according to the technology of the present disclosure. Therefore, it goes without saying that unnecessary parts may be deleted, or new elements may be added or replaced with respect to the contents of the above description and the contents of the drawings, within a scope not departing from the scope of the technology of the present disclosure.

The disclosure of Japanese Patent Application No. 2021-157275 filed on Sep. 27, 2021 is incorporated herein by reference in its entirety. All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. An information processing apparatus comprising at least one processor, wherein the processor is configured to:

acquire a group of images, which are spatially or temporally continuous, of a subject;

extract a region of interest respectively from each image of the group of images;

assign mutually independent attribute information to the region of interest in each image of the group of images, wherein the group of images comprises a first image assigned with a first type of lesion and a second image assigned with a second type of lesion different from the first type of lesion; and display a slider bar for receiving an operation of selecting an image to be displayed on a display among the group of images, on the display by changing a display form based on the attribute information that is assigned to each of the images, wherein in response to the first image being selected, the slider bar is displayed in a first display form corresponding to the first type of lesion, and wherein in response to the second image being selected, the slider bar is displayed in a second display form, different from the first display form, corresponding to the second type of lesion.

2. The information processing apparatus according to claim 1, wherein the processor is configured to:

enlarge a portion of the slider bar corresponding to an image in a range determined based on designated attribute information among the group of images; and display the portion of the slider bar on the display.

3. The information processing apparatus according to claim 1, wherein the processor is configured to display markers having different forms depending on the attribute information at a position corresponding to the slider bar with respect to each of the images.

4. The information processing apparatus according to claim 1, wherein the processor is configured to display a marker at a position corresponding to the slider bar with respect to an image to which designated attribute information is assigned.

5. The information processing apparatus according to claim 1, wherein the region of interest is a region of a structure included in the image.

6. The information processing apparatus according to claim 1, wherein the region of interest is a region of an abnormal shadow included in the image.

7. The information processing apparatus according to claim 1, wherein the region of interest is a region that is included in the image and that is designated by a user.

8. The information processing apparatus according to claim 1, wherein the attribute information indicates a type of the region of interest.

9. The information processing apparatus according to claim 1, wherein the attribute information indicates a feature amount of the region of interest.

10. The information processing apparatus according to claim 1, wherein the processor is configured to:

generate the attribute information based on a feature amount of the extracted region of interest.

11. The information processing apparatus according to claim 10, wherein the processor is configured to assign information that indicates an extraction method used for extracting the region of interest to an image from which the region of interest is extracted, as the attribute information.

12. The information processing apparatus according to claim 1, wherein the attribute information indicates a purpose for which the image is captured.

13. The information processing apparatus according to claim 1, wherein the attribute information is input by a user.

14. An information processing method comprising:

acquiring a group of images, which are spatially or temporally continuous, of a subject;

extracting a region of interest respectively from each image of the group of images;

assigning mutually independent attribute information to the region of interest in each image of the group of images, wherein the group of images comprises a first image assigned with a first type of lesion and a second image assigned with a second type of lesion different from the first type of lesion; and displaying a slider bar for receiving an operation of selecting an image to be displayed on a display among the group of images, on the display by changing a display form based on the attribute information that is assigned to each of the images, wherein in response to the first image being selected, the slider bar is displayed in a first display form corresponding to the first type of lesion, and wherein in response to the second image being selected, the slider bar is displayed in a second display form, different from the first display form, corresponding to the second type of lesion.

15. A non-transitory computer-readable storage medium storing an information processing program causing a computer to execute a process, the process comprising:

acquiring a group of images, which are spatially or temporally continuous, of a subject;

extracting a region of interest respectively from each image of the group of images;

assigning mutually independent attribute information to the region of interest in each image of the group of images, wherein the group of images comprises a first image assigned with a first type of lesion and a second image assigned with a second type of lesion different from the first type of lesion; and displaying a slider bar for receiving an operation of selecting an image to be displayed on a display among the group of images, on the display by changing a display form based on the attribute information that is assigned to each of the images, wherein in response to the first image being selected, the slider bar is displayed in a first display form corresponding to the first type of lesion, and wherein in response to the second image being selected, the slider bar is displayed in a second display form, different from the first display form, corresponding to the second type of lesion.

* * * * *